United States Patent
Huang

(10) Patent No.: US 11,381,383 B2
(45) Date of Patent: Jul. 5, 2022

(54) METHODS AND APPARATUSES FOR PROCESSING SERVICE USING BLOCKCHAIN

(71) Applicant: ALIPAY (HANGZHOU) INFORMATION TECHNOLOGY CO., LTD., Zhejiang (CN)

(72) Inventor: Qi Huang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/349,749

(22) Filed: Jun. 16, 2021

(65) Prior Publication Data
US 2021/0314136 A1 Oct. 7, 2021

(30) Foreign Application Priority Data
Sep. 22, 2020 (CN) .......................... 202011000622.6

(51) Int. Cl.
*H04L 9/06* (2006.01)
*G16Y 40/10* (2020.01)

(52) U.S. Cl.
CPC ............ *H04L 9/0618* (2013.01); *G16Y 40/10* (2020.01); *H04L 2209/38* (2013.01)

(58) Field of Classification Search
CPC ... H04L 9/0618; H04L 2209/38; G16Y 40/10; G06F 9/4482; G06Q 40/04
See application file for complete search history.

(56) References Cited

U.S. PATENT DOCUMENTS 10,022,613 B2 * 7/2018 Tran .................... G06F 3/011
11,257,151 B2 * 2/2022 Cella .................. G06K 9/6215
(Continued)

FOREIGN PATENT DOCUMENTS

| CN | 108520462 | 9/2018 |
| CN | 108876610 | 11/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Taghi T Arani
*Assistant Examiner* — Blake I Narramore
(74) *Attorney, Agent, or Firm* — Fish & Richardson P.C.

(57) ABSTRACT

An exemplary method for processing a corresponding service based on an event detected at a physical device using a blockchain includes receiving an event model identifier and data of an event, wherein the event model identifier indicates an event model for describing the event, and the data comprises one or more parameters in the event model; determining a contract identifier associated with the event model identifier based on a predetermined relationship between the event model identifier and the contract identifier; identifying a smart contract in a blockchain network based on the contract identifier; and sending a request that invokes the smart contract to a first node in the blockchain network based on the contract identifier and that causes each node in the blockchain network to invoke the smart contract based on the data to perform service processing logic corresponding to the smart contract.

20 Claims, 7 Drawing Sheets

(56) References Cited

U.S. PATENT DOCUMENTS

| | | | | |
|---|---|---|---|---|
| 2014/0195098 A1* | 7/2014 | Lorenz | ................... | G07C 5/008 |
| | | | | 701/29.3 |
| 2016/0197772 A1* | 7/2016 | Britt | ................... | H04L 63/0428 |
| | | | | 370/254 |
| 2017/0310747 A1* | 10/2017 | Cohn | ................... | H04L 67/1068 |
| 2018/0117447 A1* | 5/2018 | Tran | ....................... | G16H 10/60 |
| 2019/0213564 A1 | 7/2019 | Chan et al. | | |
| 2020/0294133 A1* | 9/2020 | Celia | ................... | G06F 16/2379 |
| 2021/0056141 A1* | 2/2021 | Wojcik | ................... | H04L 9/3239 |
| 2021/0233672 A1* | 7/2021 | Patil | ....................... | G16Y 40/35 |
| 2021/0314293 A1* | 10/2021 | Soundararajan | ...... | H04L 63/083 |
| 2021/0319632 A1* | 10/2021 | Dutta | ................... | G06F 16/9035 |
| 2021/0326880 A1* | 10/2021 | Yang | ................ | G06Q 20/38215 |
| 2021/0328806 A1* | 10/2021 | Yang | ..................... | H04L 9/3247 |

FOREIGN PATENT DOCUMENTS

| | | | |
|---|---|---|---|
| CN | 110046907 | 7/2019 | |
| CN | 110084708 | 8/2019 | |
| CN | 110557384 | 12/2019 | |
| CN | 110602227 | 12/2019 | |
| CN | 110741599 | 1/2020 | |
| CN | 111090874 | 5/2020 | |
| CN | 111310237 | 6/2020 | |
| WO | WO-2019165330 A1 * | 8/2019 | ............... H04L 9/32 |

OTHER PUBLICATIONS

Manjunath et al., "IoT Driven with Big Data Analytics and Block Chain Application Scenarios," 2018 Second International Conference on Green Computing and Internet of Things (ICGCIoT), Jul. 2019, pp. 569-572.

Mei, "Design and Implementation of a Security Platform for the Internet of Things Based on Blockchain," China Master's Theses Full-Text Database Information Technology, Nov. 30, 2018, 69 pages (with English abstract).

Nakamoto, "Bitcoin: A Peer-to-Peer Electronic Cash System," www.bitcoin.org, 2005, 9 pages.

* cited by examiner

METHODS AND APPARATUSES FOR PROCESSING SERVICE USING BLOCKCHAIN

CROSS-REFERENCE TO RELATED APPLICATIONS

This application claims priority to Chinese Patent Application No. 202011000622.6, filed on Sep. 22, 2020, which is hereby incorporated by reference in its entirety.

TECHNICAL FIELD

One or more embodiments of the present specification relate to the field of computer technologies, and in particular, to methods and apparatuses for processing a service using a blockchain.

BACKGROUND

As the network technologies develop, there are more and more intelligent interconnection applications between devices. For example, the concept of the Internet of Everything is promoted in the Internet of Things (IoT). In the IoT, various physical entities can be sensed by using an Internet of Things device (which can also be referred to as an IoT device) to generate a large quantity of data and event notifications, and trigger a corresponding service processing logic, so that another physical entity or a computer performs a corresponding service. For example, when a door lock of a household in a residential compound is unlocked abnormally (such as violent cutting off or automatic unlocking through demagnetization), an alarm system of a property monitoring center gives a sound alarm prompt. Both the door lock of the household and the alarm system can be entities in the IoT, the abnormal door lock unlocking is a trigger event, and that the alarm system gives the sound alarm prompt is a service processing logic triggered by the door lock exception event.

Usually, intelligent interaction between devices depend on related data interaction. For example, an event and data perceived by the IoT device are associated with a user-defined function (UDF). The event generated by the IoT device automatically trigger execution of UDF, and complete interaction with and service processing of another device. However, in actual application, multiple-party data sharing and collaboration exist. In this case, how to provide a solution that can provide an effective collaboration solution across a data center platform is a problem of significant meaning.

SUMMARY

One or more embodiments of the present specification describe methods and corresponding apparatuses for processing a service using a blockchain. The methods and apparatuses can be used to provide a broader service interaction solution by crossing a data centralized platform in entity interconnection and cooperation.

According to a first aspect, a method for processing a service using a blockchain is provided. Several smart contracts are deployed in the blockchain by at least one service party, and a single smart contract corresponds to a predetermined service processing logic. The method is performed by an association center and includes: receiving a first model identifier and corresponding first data that correspond to a first event, where the first model identifier is used to indicate a first event model, and the first data is used as parameter data in the first event model to describe the first event; determining a first contract identifier associated with the first model identifier based on a pre-stored association relationship between a model identifier and a contract identifier, where the first contract identifier is used to indicate a first smart contract in the several smart contracts, and is provided by a blockchain network when a first service party registers the first smart contract with the blockchain network, and the association center records an association relationship between the first contract identifier and at least one model identifier; and sending, based on the first contract identifier, a first request that invokes the first smart contract to a first node in the blockchain network, so that each node in the blockchain network invokes the first smart contract based on the first data, to perform the service processing logic corresponding to the first smart contract.

According to an embodiment, the first event model is used to describe a first state or first state change information of a first entity.

According to an embodiment, the first model identifier is provided by the association center for the first event model, and the association center provides the first model identifier in the following manner: receiving an event model query request of a first device party, and feeding back a current event model list to the first device party; and allocating the first model identifier to the first event model when the first device party selects no event model from the event model list and uploads the first event model.

According to an embodiment, the method further includes: feeding back the first model identifier corresponding to the first event model to the first device party when the first device party selects the first event model from the event model list.

According to an embodiment, the association center records the association relationship between the first contract identifier and the at least one model identifier in the following manner: receiving an event model query request of the first service party, and feeding back a current event model list to the first service party; and determining, based on several event models selected by the first service party from the event model list and the uploaded first contract identifier, that the first contract identifier has an association relationship with a model identifier corresponding to each of the several selected event models.

According to an embodiment, the service processing logic of the first smart contract processes a service by using the first data as an input parameter, the first request corresponds to a first transaction, and a data field of the first transaction includes variable assignment information indicating that the first data is assigned to a corresponding parameter in the first smart contract.

According to an embodiment, the first event is sent by a first device party, a first verification logic further corresponds to the first smart contract in the association center, and the sending, based on the first contract identifier, a first request that invokes the first smart contract to a first node in the blockchain network further includes: performing the first verification logic on the first data based on the first contract identifier; and sending the first request that invokes the first smart contract to the first node in the blockchain network when the verification succeeds.

According to an embodiment, the first verification logic includes verification for at least one piece of the following data: user rights of the first device party; whether a data format of the first data is correct; or whether the first data is complete.

According to an embodiment, before the sending, based on the first contract identifier, a first request that invokes the first smart contract to a first node in the blockchain network, the method further includes: determining a nearest node as the first node from a plurality of nodes in the blockchain network.

According to an embodiment, the blockchain network further includes a second node corresponding to the first service party.

According to a second aspect, a method for processing a service using a blockchain is provided. Several smart contracts are deployed in the blockchain by at least one service party, and a single smart contract corresponds to a service processing logic triggered by a predetermined event. The method is performed by an association center, and the association center is a node in a blockchain network. The method includes: receiving a first model identifier and corresponding first data that correspond to a first event, where the first model identifier is used to indicate a first event model, and the first data is used as parameter data in the first event model to describe the first event; determining a first contract identifier associated with the first model identifier based on a pre-stored association relationship between a model identifier and a contract identifier, where the first contract identifier is used to indicate a first smart contract in the several smart contracts, and is provided by the blockchain network when a first service party registers the first smart contract with the blockchain network, and the association center records an association relationship between the first contract identifier and at least one model identifier; and generating a first transaction that invokes the first smart contract based on the first contract identifier and the first data and based on the first data, so that each node in the blockchain network invokes the first smart contract based on the first data, to perform the service processing logic corresponding to the first smart contract.

According to a third aspect, an apparatus for processing a service using a blockchain is further provided. Several smart contracts are deployed in the blockchain by at least one service party, and a single smart contract corresponds to a predetermined service processing logic. The apparatus is placed at an association center and includes: a receiving unit, configured to receive a first model identifier and corresponding first data that correspond to a first event, where the first model identifier is used to indicate a first event model, and the first data is used as parameter data in the first event model to describe the first event; a determining unit, configured to determine a first contract identifier associated with the first model identifier based on a pre-stored association relationship between a model identifier and a contract identifier, where the first contract identifier is used to indicate a first smart contract in the several smart contracts, and is provided by a blockchain network when a first service party registers the first smart contract with the blockchain network, and the association center records an association relationship between the first contract identifier and at least one model identifier; and a request unit, configured to send, based on the first contract identifier, a first request that invokes the first smart contract to a first node in the blockchain network, so that each node in the blockchain network invokes the first smart contract based on the first data, to perform the service processing logic corresponding to the first smart contract.

According to a fourth aspect, an apparatus for processing a service using a blockchain is further provided. Several smart contracts are deployed in the blockchain by at least one service party, and a single smart contract corresponds to a service processing logic that can be triggered by a predetermined event. The apparatus is placed in an association center, and the association center is a node in the blockchain network. The apparatus includes: a receiving unit, configured to receive a first model identifier and corresponding first data that correspond to a first event, where the first model identifier is used to indicate a first event model, and the first data is used as parameter data in the first event model to describe the first event; a determining unit, configured to determine a first contract identifier associated with the first model identifier based on a pre-stored association relationship between a model identifier and a contract identifier, where the first contract identifier is used to indicate a first smart contract in the several smart contracts, and is provided by a blockchain network when a first service party registers the first smart contract with the blockchain network, and the association center records an association relationship between the first contract identifier and at least one model identifier; and a generation unit, configured to generate a first transaction that invokes the first smart contract based on the first contract identifier and the first data and based on the first data, so that each node in the blockchain network invokes the first smart contract based on the first data, to perform the service processing logic corresponding to the first smart contract.

According to a fifth aspect, a computer readable storage medium storing a computer program is provided. When the computer program is performed in a computer, the computer is enabled to perform the method in the first aspect or the second aspect.

According to a sixth aspect, a computing device is provided, including a memory and a processor. The memory stores executable code, and when performing the executable code, the processor implements the method in the first aspect or the second aspect.

According to the methods and apparatuses provided in the embodiments of the present specification, a smart contract is pre-deployed in the blockchain, and the smart contract includes a service processing logic triggered by an event. In addition, an event party generating or monitoring an event registers a unified event model with the association center. The association center also records an association relationship between an event model and a smart contract. According to the method, when an event occurs, the event party can send a model identifier and a related parameter to the association center, and the association center routes to a corresponding smart contract and applies to the blockchain network for invoking the corresponding smart contract. In one aspect, the unified event model is used to describe an event and record data, so that a smart contract registered by a service party can be simultaneously connected to a plurality of event parties. In another aspect, the smart contract deployed in the blockchain network is invoked by using an accurate route of the association center, and a capability of sharing and cooperating blockchain network data is fully utilized to better implement multi-party cooperation.

BRIEF DESCRIPTION OF DRAWINGS

To describe the technical solutions in the technical solution embodiments of the present specification more clearly, the following briefly introduces the accompanying drawings needed for describing the embodiments. Clearly, the accompanying drawings in the following description show merely some embodiments of the technical solutions of the present specification, and a person of ordinary skill in the art can still derive other drawings from these accompanying drawings without creative efforts.

DESCRIPTION OF IMPLEMENTATIONS

Figure 1A:
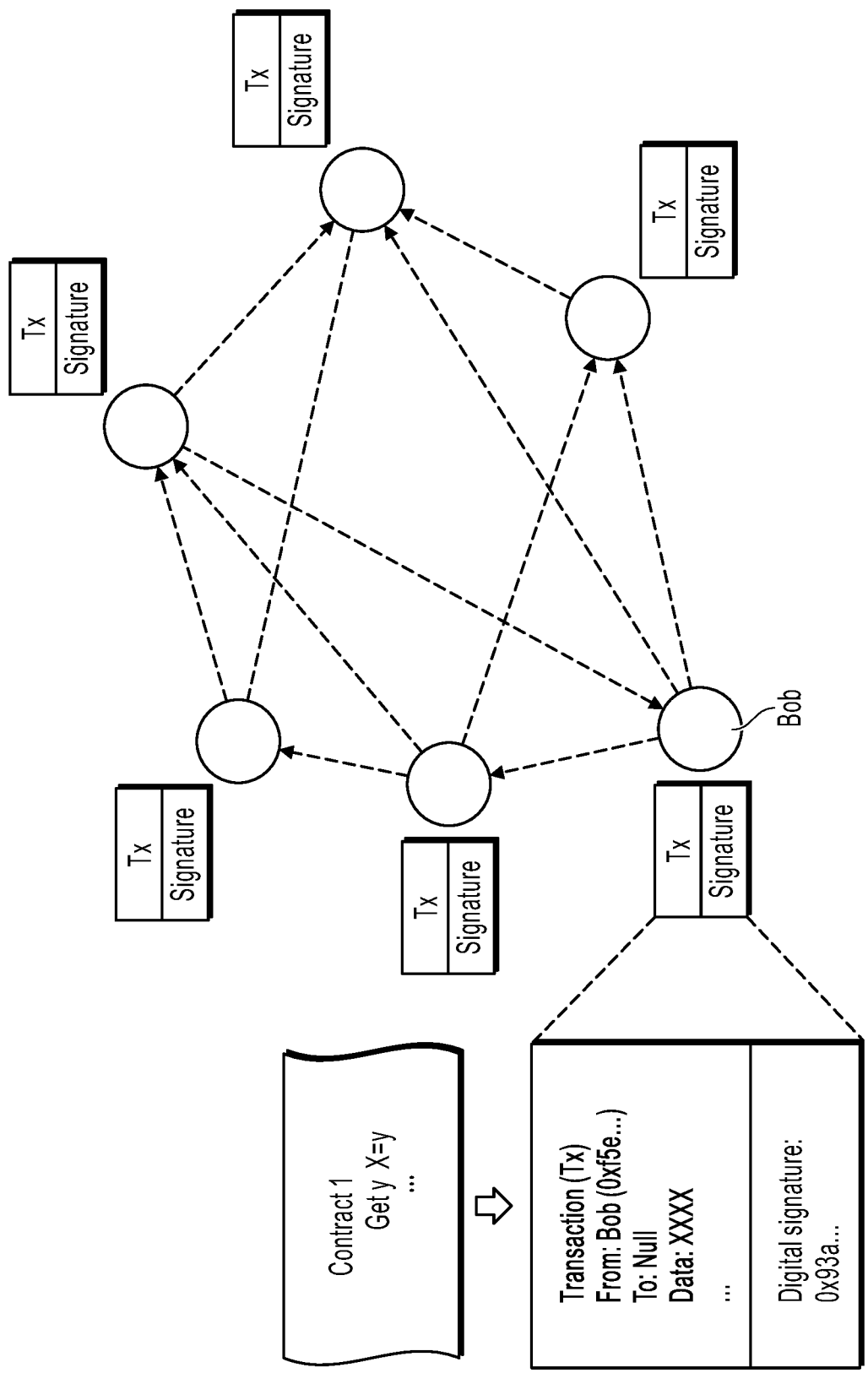
FIG. 1A is a schematic diagram illustrating a process of creating a smart contract in a blockchain network.

The following describes the solutions provided in the present specification with reference to accompanying drawings.

As known to a person skilled in the art, a blockchain network is a distributed storage and recording system and includes a plurality of nodes, and the nodes can communicate transaction data with each other. A smart contract is a program logic that can be performed automatically. After being published or created, the smart contract is written into a blockchain in a digitized manner, and can be performed by each node in the blockchain network. More and more blockchain networks support the smart contract, to implement multiple functions in the blockchain. The following describes in detail a concept of the blockchain and the smart contract with reference to FIG. TA and FIG. 1B.

Referring to FIG. TA, in the blockchain network, a transaction Tx is a basic storage unit in a block, and various types of data to be stored on a blockchain are usually recorded by using the transaction Tx as a carrier. In a current mainstream blockchain, one block can store a plurality of transactions, for example, hundreds of transactions. It is worthwhile to note that a node in the present specification can also be referred to as a full node or an accounting node, and is a computing device that can generate a new block based on the transaction Tx and store the block in the blockchain. Typically, the blockchain network can be a consortium blockchain, and it is agreed that a plurality of organizations serve as accounting nodes in the blockchain network. A subsequent transaction to be recorded is agreed by using an agreed consensus mechanism such as the Proof of Stake protocol and the Byzantine Fault Tolerance (BFT) consensus protocol, and the transaction content is packed to form a block for recording on the blockchain.

FIG. TA is a schematic diagram illustrating a process of creating a smart contract in a blockchain network. More specifically, FIG. TA is described with reference to the Ethereum. Assume a node, whose corresponding service party is assumed as Bob, wants to publish a smart contract Contract 1, and the smart contract includes an operation on variables x and y. Bob can publish the contract in a form of a transaction. Specifically, Bob can initiate a transaction Tx. In transaction content, an initiating party "from" field is Bob (which can specifically be a network address of Bob), and a receiving party "to" field is set to a null value. In addition, the transaction content further includes a data field, and the data field includes a code obtained after the smart contract is compiled into a bytecode. After Bob publishes such a transaction to the blockchain network, an accounting node adds the transaction to the blockchain network by using a consensus mechanism. In this process, a contract identifier is assigned to the smart contract based on a certain algorithm, for example, performing hashing based on the address of the publisher. The contract identifier can also be referred to as a contract address (contract ID), such as 0x6f. As such, one smart contract corresponds to one contract address, and the contact address is similar in form to an address such as a user account.

Figure 1B:
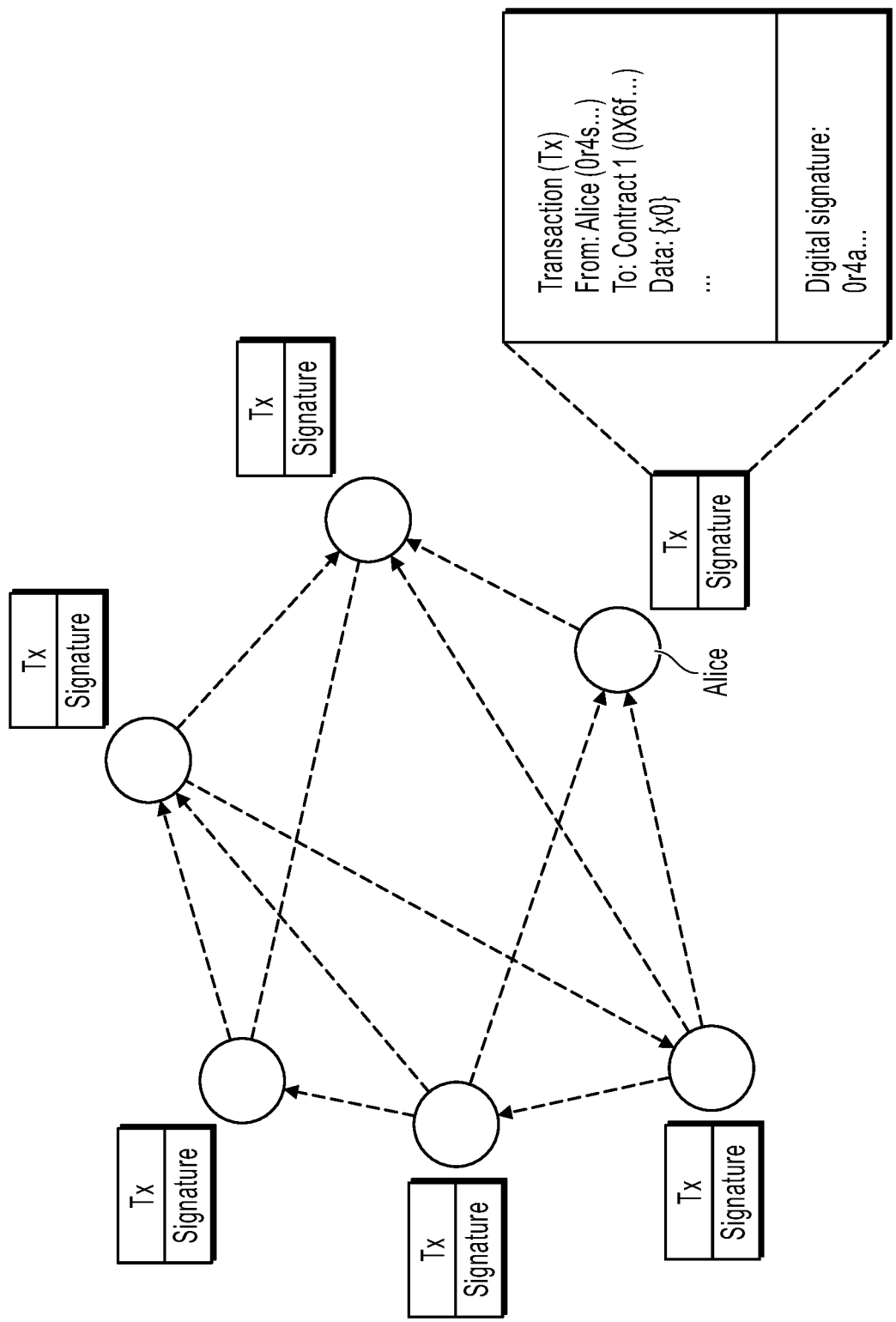
FIG. 1B is a schematic diagram illustrating a process of invoking the smart contract created in FIG. 1A from the blockchain network.

After the smart contract is packed and recorded to a blockchain, any user in the blockchain network can invoke the smart contract. FIG. 1B is a schematic diagram illustrating a process of invoking the smart contract created in FIG. TA from the blockchain network. Assume that a node Alice in the blockchain network wants to invoke the smart contract, the node can initiate a transaction for contract invoking.

Specifically, in transaction content, the "from" field can be a network address of the invoking user Alice, and the to field is the contract address 0x6f . . . of the smart contract, indicating the smart contract invoked by the transaction. The data field includes a method or function name and an input parameter in the contract to be invoked, such as a value x0 of the variable x. After receiving the transaction, another node performs an operation corresponding to a contract logic by using a virtual machine in the node, and change a contract status in the network by using the consensus mechanism, including changing a variable value in the contract. When the contract logic relates to another service party, execution of the smart contract can further include sending a service processing instruction to the corresponding service party by using any node in the blockchain. Optionally, after a service processing result is recorded to a blockchain, the corresponding service party can further change the contract status in the network by using the consensus mechanism. For example, after the contract is invoked, any node in the network can finds that the value of the variable x in the contract becomes x0 when viewing the variable of the contract.

Figure 2:
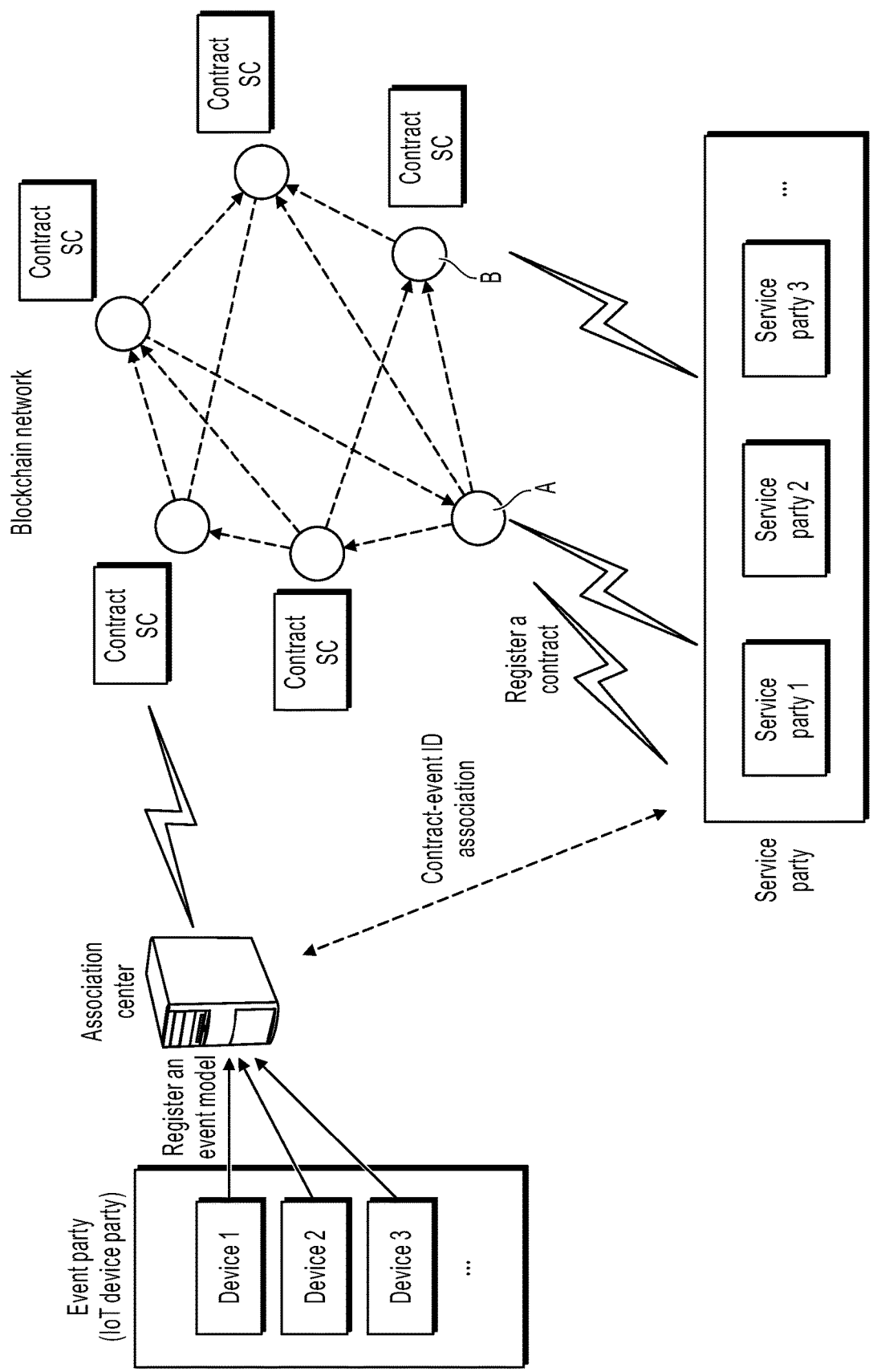
FIG. 2 is a schematic diagram illustrating an embodiment scenario of an embodiment disclosed in the present specification.

Based on the features of the blockchain network and the smart contract, an embodiment scenario of an embodiment shown in FIG. 2 is implemented by using the smart contract in the embodiments of the present specification. To make a concept of the technical solutions provided in the present specification more clear, FIG. 2 shows an example in which an IoT control scenario is used as a specific service scenario. As described above, multiple-party data sharing and cooperation exist in actual application of the IoT. Depending on direct control or centralized control between IoT devices may not be conducive to such sharing and cooperation. Therefore, a service processing architecture based on a blockchain and a smart contract is proposed by using the present specification, to open a channel between data parties in the IoT, and weaken impact of centralization on service processing of a plurality of data parties as much as possible.

The embodiment architecture of the present specification can include an event party, an association center, a blockchain network, and a service party. The event party can be a service party generating various events. In practice, the event party can be determined based on a service needs. As shown in FIG. 2, in an IoT service scenario, the event party can be a device party of an Internet of Things device (IoT device). The IoT device can be various devices monitoring a physical entity in the IoT. The physical entity can be various entities that can perceive a state or an attribute of the physical entity, such as a delivery vehicle, a vehicle owner, goods, a wind direction, an atmospheric pressure, a bus or van station, a door, a door lock, an electric light, a refrigerator, etc. Correspondingly, the IoT device can be various devices that monitor states or attributes of these physical entities, such as a vehicle positioning apparatus, a terminal associated to the vehicle owner, and a barometer. The IoT device can be held by a device party. One device party can hold one or more IoT devices.

The state or attribute or a change of the state or attribute of the physical entity monitored by the IoT device can be used by the device party as an event to establish an event model for registering with the association center (such as an IoT control center), and the association center provides the device party with an identifier of the registered event model (or referred to as a model ID). The so-called event model can be understood as a model describing an event by using a related parameter. For example, an event model can be established for a vehicle movement event by using parameters such as a vehicle speed, a direction, and location coordinates. More specifically, when the vehicle speed, the direction, and the location coordinates satisfy a station entering condition, it can be determined that the event is a vehicle entering station event.

The service party can be an execution party of various services, and the service here can be a physical entity service, such as goods transportation; or can be a computer logic service, for example, increasing an account consumption amount. The service party can be a device needed in a service performing process or a device party holding a corresponding device. In other words, the device party can be the event party or the service party. To make the embodiment architecture of the present specification more clear, the event party (the device party) is shown separately from the service party in FIG. 2. Actually, in some embodiments, the event party can be a device used by the service party to process a service.

The service party can process a corresponding service based on an event generated by the event party, for example, a state change of the physical entity monitored by the IoU device. To reduce impact of centralization on a device, the service party can pre-register a smart contract with the blockchain network by using an association between an event and a service, to obtain a contract identifier (also referred to as a contract ID) of the smart contract, for example, a contract SC. The service party can register the smart contract with the blockchain network by using any node in the blockchain. For example, in FIG. 2, service party 1 and service party 2 registers the smart contract by using node A, and service party 3 registers the smart contract by using node B, and so on. After the smart contract is successfully registered, the smart contract has a corresponding contract identifier provided by the blockchain, and is deployed at each node in the blockchain network.

Then an association between an event and a smart contract can be made for the registered event model and smart contract. Establishment of this association relationship can be selected by the service party by using an operation platform (such as an interactive APP), or can be determined through private negotiation between the association center and the service party. Embodiments are not limited here. An association between an event ID and a contract ID can be stored by the association center (IoU control center). The service party only needs to associate with a node in the blockchain, and does not need to associate with the association center.

In an optional embodiment, the event party is configured to upload an event, and the event model can be further established by the service party and registered with the association center. In this case, the event party can obtain, from the association center, the event model or model ID and parameter data needed for uploading the event. The service party can directly send the association relationship between the model ID of the event model and the contract ID to the association center, and the association center records the association relationship.

As such, when detecting an event (for example, a door lock is unlocked abnormally), the event party (for example, a device party of the IoU device) can upload related data to the association center. The association center can determine an ID of a contract that needs to be performed, that is, an address of the smart contract, based on an event ID corresponding to a corresponding event model and the association relationship between the event ID and the contract ID, and apply to the blockchain for invoking the corresponding smart contract. The smart contract can include a service logic that needs to be performed, for example, a value accumulation logic or a device action logic of another service party. For example, as shown in FIG. 1A, the smart contract can be a smart contract SC created and published by a node, and the contract SC can be recorded in the blockchain after being published, and deployed at each node in the blockchain network. When the smart contract SC relates to a device action logic of another service party (for example, an alarm system of service party 1 is enabled), any node in the blockchain can instruct the service party to process a corresponding service based on the smart contract. Since the blockchain network is a decentralized network, this deployment can span various limitations such as an area boundary between the event party and the service party, and an owner boundary, thereby providing an effective execution solution for processing a service through multi-party data cooperation.

The following describes a specific execution process of service processing by using a blockchain.

Figure 3:
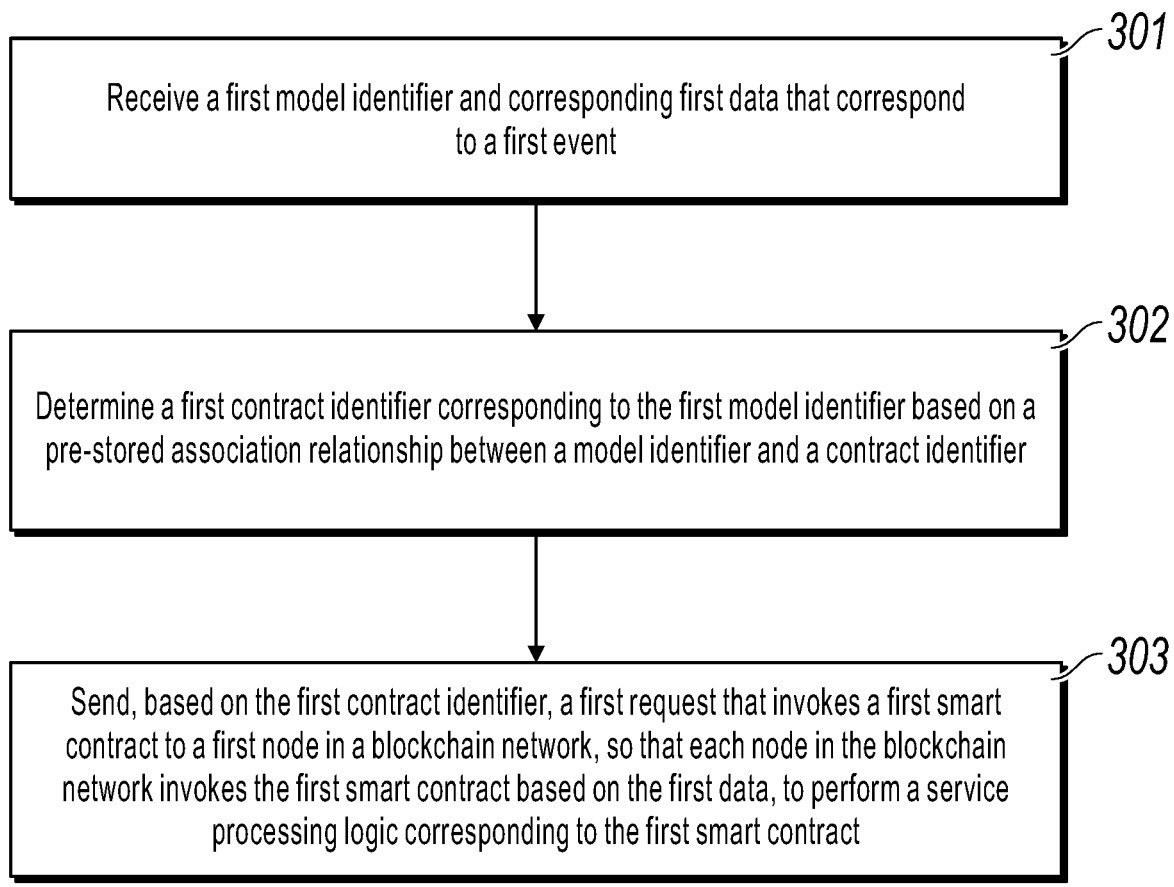
FIG. 3 is a schematic flowchart illustrating a method for processing a service using a blockchain, according to an embodiment.

FIG. 3 is a schematic flowchart illustrating a service processing method by using a blockchain, according to an embodiment. The method process is performed by an association center located outside a blockchain network. The association center can be implemented by any device, platform, or device cluster with computing and processing capabilities. In addition, several smart contracts can be pre-deployed by a plurality of service parties in the blockchain network, and each smart contract includes a service processing logic triggered by an event. The event can be provided by an event party.

As shown in FIG. 3, first, in step 301, a first model identifier and corresponding first data that correspond to a first event are received. The first event here can be any event generated by a target entity monitored by an IoT device corresponding to the event party (for example, a device party of the IoT device) or by the IoT device. The target entity can be various entities in a specific monitoring scenario, for example, one or more of a mechanical device, an electronic device, a substance attribute (such as an atmospheric pressure), an article for daily user, or an article attribute. The IoT device here usually can be an electronic device that has a data processing capability and can use a status of a terminal device and a change of the status as an event to feed back to the association center, for example, can be smart sensor that can change a detected atmospheric pressure from 101 kPa to a monitoring value of 102 kPa, and convert the change into an event that an atmospheric pressure increment exceeds a predetermined threshold (for example, 500 kPa).

Usually, an object model related to service processing can include the following parts: an attribute, an event, and a service. The attribute defines static attributes or dynamic data of an entity, such as a brand of a vehicle, a license plate number, a driving mileage, or a start or stop time. The event defines a status change or an event generated by the entity, for example, the vehicle arrives at an endpoint, or the vehicle is faulty/in an accident. The service defines a service capability that can be provided externally by the entity, such as a vehicle-bound goods order and a current driver.

An event model usually can indicate a generic definition of a type of event. Therefore, the event model can be used for a plurality of state parameters with an event result. A specific parameter describes a specific event. For example, an event model of a traveling event of a delivery vehicle can relate to specific parameters such as a traveling direction, a traveling speed, a traveling distance, and an engine status, and an association relationship between the parameters. In a specific process of performing detection by a specific IoT device, the event party collects related data by monitoring the target entity (the IoT device or the target entity monitored by the IoT device). When an event occurs, a model ID of an event model corresponding to the event and a specific parameter can be provided to the association center. The event model can have attribute and service parameters in the previous object model, such as engine horsepower, a vehicle lifespan, and a vehicle model. It can be understood that one event model can further describe a plurality of events. For example, if a corresponding parameter item in an event model has different parameter values, the parameter item corresponds to different events.

In an implementation, the event party can pre-register an event model with the association center to describe a type of event, for example, an event generated by the IoU device or the target entity monitored by the IoU device in an IoU control scenario. In a specific example, for example, an event monitored by an intelligent barometric pressure sensor for an atmospheric pressure can include the following: the atmospheric pressure is relatively high (for example, higher than a relatively high threshold), the atmospheric pressure is relatively low (for example, lower than a relatively low threshold), the atmospheric pressure resumes to normal, and so on. The event party can pre-establish an event model to register with the IoU device center based on a possible event, such as a possible status change of the IoU device or the target entity monitored by the IoU device.

The event party can pre-establish the event as the event model and register the event model with the association center. The event model can include various event parameters, for example, a vehicle engine has high temperature; and can further include features of the target entity such as an attribute or a service, for example, attributes such as a vehicle model, a license plate number, horsepower, a load weight, a goods accommodation size, and service features such as a current physical condition of a driver (such as blood pressure, a heart rate, and a fatigue degree), and an order quantity.

When the event party registers the event model with the association center, the association center can allocate a unique corresponding model identifier to the corresponding event model. The model identifier is equivalent to an identity ID of the event model, and a specific type of event for a specific target entity can be uniquely determined by using the model identifier. For example, a first device party corresponding to an IoT device can serve as an event party to establish a first event model for a first event that describes a first state or state change information of a first entity, and register the first event model with the association center. The association center can allocate a first model identifier to the first event model.

As such, the association center can record a one-to-one mapping relationship between an event model and a model identifier. When the event party detects that the first event actually occurs, as a response, the device party can report the model ID corresponding to the first event model and a corresponding parameter to the association center.

In another implementation, the event model can further be established by the service party based on a need of the service part, and register the event model with the association center, and is then provided to a qualified event party by the association center.

In another implementation, the event party can first query whether a corresponding event has a registered event model. For example, the device party can request an event model list from an IoU device center and select an appropriate event model from the event model list provided by the association center. If the appropriate event model exists, a corresponding model ID can be obtained. If no appropriate event model exists, a new event model can be established to register with the association center.

In more implementations, there can be another manner of establishing the event model, and details are omitted here. In the previous implementation, one event model can be jointly used by a plurality of event parties by using a registration selection mechanism, so as to provide a unified event model to record data, helping the service party to perform compatibility and adaptation without modifying a service contract code when connecting to a plurality of event parties.

For an actually occurred event, the event party can upload a model ID and a specific parameter to the association center. The association center can receive the model ID and the specific parameter. Assume that the event occurred is the first event and corresponds to the first model identifier and the first data providing the specific parameter in the first event model. In this case, when the first event occurs, the association center can receive the first model identifier and the first data. The first model identifier can be used to indicate the first event model.

Next, in step 302, a first contract identifier associated with the first model identifier is determined based on a pre-stored association relationship between a model identifier and a contract identifier. According to the previous description, several smart contracts can be pre-deployed in the blockchain network. A single smart contract can be generated by a service party in a plurality of service parties and uploaded to the blockchain. The smart contract here can be a smart contract including a predetermined service processing logic, for example, a telephone notification about arrival of goods for a user.

To establish a mapping relationship between a smart contract and an event model in the blockchain network, an event identifier and a contract identifier of the smart contract can be recorded in a mapping relationship. According to the previous description of the smart contract, the contract identifier corresponding to the smart contract is usually provided by the blockchain network when a corresponding service party registers the smart contract with the blockchain network. Therefore, each service party can pre-register the smart contract with the blockchain network to obtain the contract identifier provided by the blockchain network. Then the service party can record an association relationship between the contract identifier and the event identifier by using the association center, so as to establish an association between an event and a service processing logic.

In an embodiment, after obtaining a contract identifier of a smart contract from the blockchain network, the service party can apply to the association center for the event model list, select a related event model, and feed back the related event model to the association center, so that the association center associates the contract identifier with an event identifier corresponding to the selected event model. Usually, this implementation is applicable to a case that the event model is registered by the event party with the association center.

In another embodiment, after obtaining a contract identifier of a smart contract from the blockchain network, the service party can negotiate (such as offline communication) with the event party or the association center to agree on a mapping relationship between the event model and the smart contract, and the association center records an event identifier of the event model and an contract identifier of the smart contract in a mapping relationship.

In another embodiment, after associating the contract identifier of the smart contract with the model identifier of the event model, the service party can send the association relationship to the association center, and the association center records the association relationship. For example, this case is applicable to a case that the event model is provided by the service party and registered with the association center.

It can be understood the event model and the smart contract can be in a one-to-one mapping relationship, one-to-many mapping relationship, or many-to-many mapping relationship. Embodiments are not limited here. In other words, one event model can correspond to one or more smart contracts, and one smart contract can also correspond to one or more event models.

In the present step 302, the association center can determine several contract identifiers corresponding to the first model identifier by using a pre-recorded mapping relationship between an event identifier and a contract identifier. For ease of description here, any contract identifier corresponding to the first model identifier can be recorded as the first contract identifier, and the first contract identifier is a contract identifier corresponding to the first smart contract.

Then in step 303, a first request that invokes the first smart contract is sent to a first node in the blockchain network based on the first contract identifier, so that each node in the blockchain network invokes the first smart contract based on the first data, to perform the service processing logic corresponding to the first smart contract.

As described above, the blockchain network includes a plurality of nodes. Therefore, the association center can select any node to send the first request. In an embodiment, the association center can determine a nearest node as the first node from the plurality of nodes in the blockchain network, to send the first request. The nearest node can be a node with a nearest physical distance, or a nearest connected node determined from a network connection perspective.

In addition, as described above, the smart contract is invoked by initiating a transaction. In an embodiment, in step 303, the association center generates a first transaction as the first request, and the first transaction can include the first data corresponding to the first event. In another embodiment, the association center adds the first data corresponding to the first event to the first request and sends the first request to the first node, so that the first node generates the first transaction including the first data. Regardless of a manner used, the generated first transaction includes the first data corresponding to the first event. More specifically, the first contract identifier and the first data are used as parameters to be input to the service processing logic of the first smart contract. As such, the contract invoking of the first smart contract is completed for the first event by performing the service processing logic in the first smart contract.

In a possible design, before step 303, the association center can further verify the data that invokes the smart contract and that is provided by the event party. The contract invoking in step 303 is performed when the verification succeeds; otherwise, the association center does not apply to the blockchain network for invoking the smart contract. The data verification can be various types of verification performed on the event party or data (for example, the first data) provided by the event party.

In an embodiment, a user ID of the event party can be verified, for example, whether a current user ID is legally registered or logged in.

In an embodiment, whether a data format is correct can also be verified. For example, whether each parameter is recorded correctly. For example, whether engine temperature is between 0□-80□, etc.

In another embodiment, whether parameters are complete is verified. For example, whether all parameters needed in the event model are completely included.

In more embodiments, the verification logic of the association center can further include another reasonable data verification item and details are omitted here.

Figure 4A:
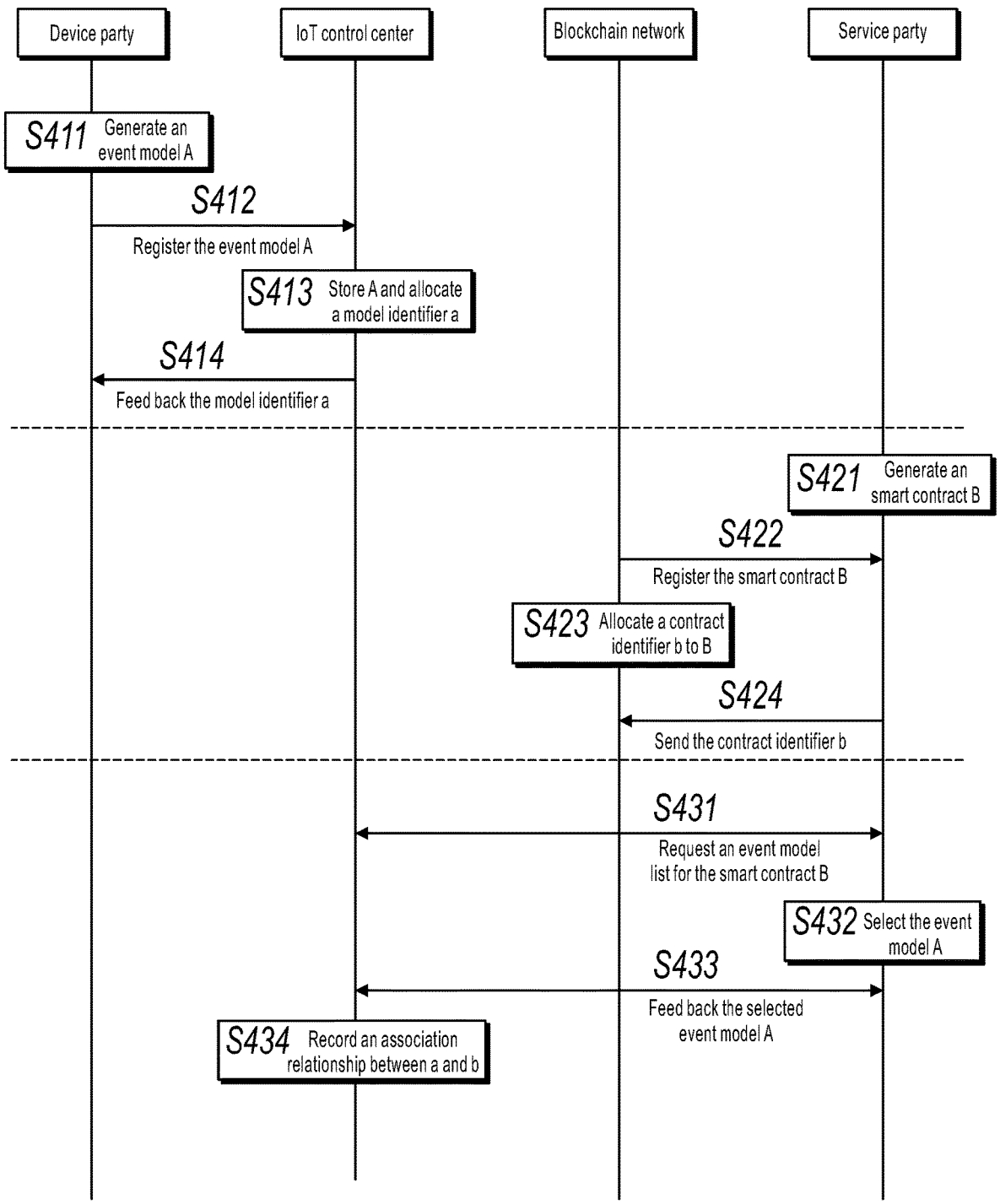
FIGS. 4A-4B are sequence flowcharts illustrating cooperation between parties in processing a service using a blockchain in a specific example.
Figure 4B:
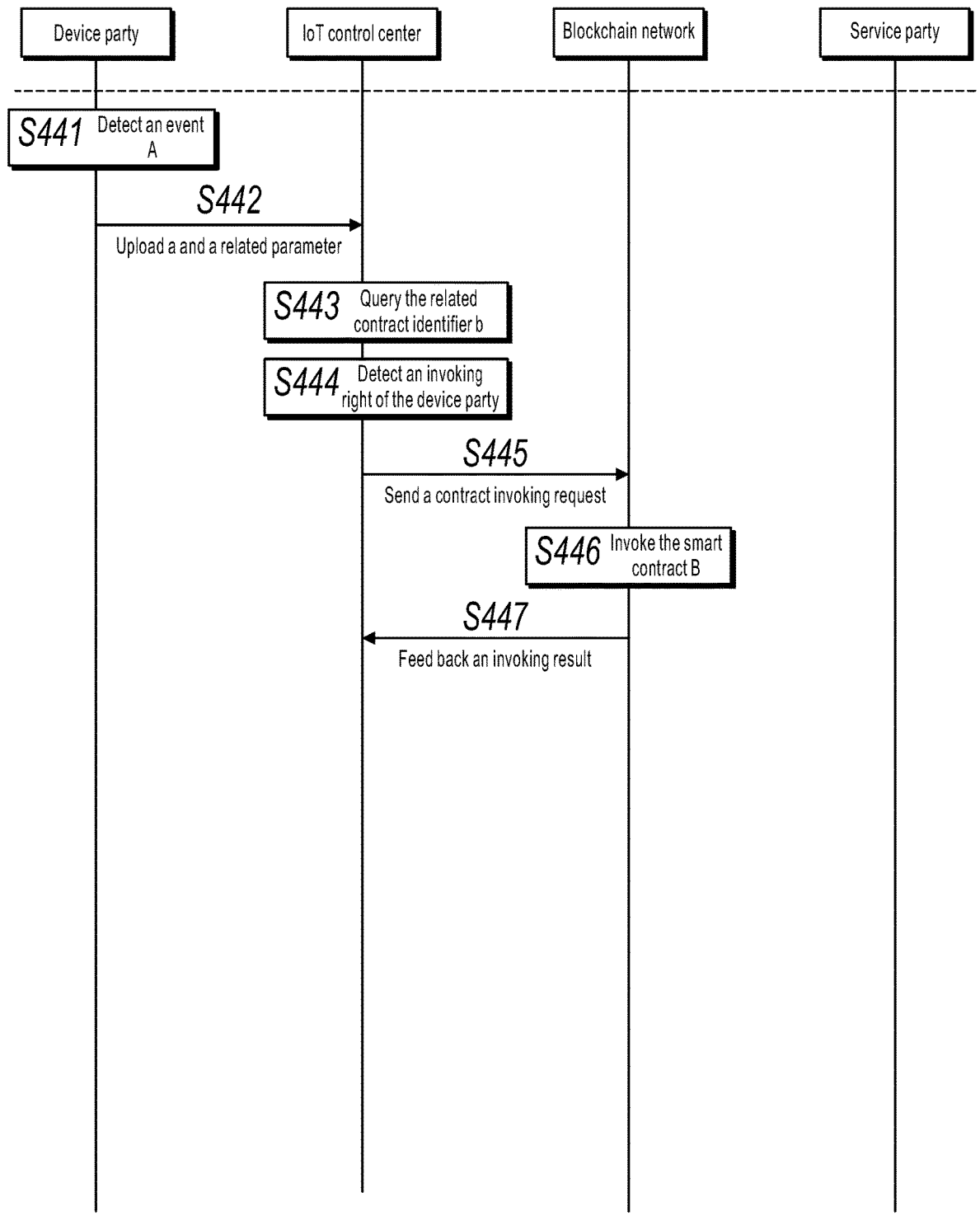

To facilitate understanding of the technical solutions in the present specification, FIGS. 4A-4B further shows a sequence diagram of interaction between parties in a specific example. The parties can include a device party (equivalent to an event party), an IoT control center (equivalent to an association center), a service party, and a blockchain network. In the specific example shown in FIGS. 4A-4B, an event model is registered by the device party, and can also be registered by the service party in practice. As shown in FIGS. 4A-4B, the sequence diagram is mainly divided into four modules separated by horizontal dotted lines. In module 1, the device party registers an event model with the IoT control center by using S411 to S414. In module 2, the service party registers a smart contract with a blockchain device by using S421 to S424. In module 3, the service party and the IoT control center interacts with each other to store an association relationship between a model identifier of the event model and a contract identifier of the smart contract in the IoT control center by using S431 to S434. In module 4, by using S441 to S447, when the device party sends an event and data to the IoT control center, the IoT control center routes a corresponding smart contract from a blockchain network.

Module 4 corresponds to the embodiment shown in FIG. 3, and module 1, module 2, and module 3 can be understood as preprocessing modules. Specifically, in module 1, the device party generates an event model A in S411, and then the device party registers the event module A with the IoT control center in S412. In S413, the IoT control center stores the event model A, and allocates a model identifier a to the event model A. The IoT control center can feed back the model identifier a to the device party in S414. Optionally, before S411, the device party can further apply to the IoU control center for an event model list, and query an appropriate event model from the event model list. A corresponding model identifier can be obtained when the appropriate event model is found, and S411 to S414 are performed when the appropriate event model is not found. In FIGS. 4A-4B, as a specific example, only a solution for directly performing S411 to S414 is provided. In module 2, the service party generates a smart contract B by using S421, and then registers the smart contract with the blockchain network by using S422. The blockchain network provides a contract identifier b for the smart contract B in S423, and feeds back the contract identifier b to the service party by using S424.

It can be understood that module 1 and module 2 are separately processes of registering the event model and the smart contract, and are independent of each other. Therefore, although module 2 is arranged after module 1 in the sequence diagrams in FIGS. 4A-4B, module 2 can be performed before module 1 or can be performed in parallel with module 1 in practice. Embodiments are not limited here.

Module 3 is a process of associating a model identifier with a contract identifier, and relates to the service party and the IoU control center. The service party requests the event model list from the IoU control center for the smart contract B by using S431. The service party selects the event model A in S432, and feeds back the selected event model A to the IoU control center by using S433. Therefore, the IoU control center establishes an association relationship between the model identifier a of the event model A and the contract identifier b of the smart contract B by using S434. Module 3 is performed based on the model identifier a and the contract identifier b. Therefore, module 3 can be after module 1 and module 2 in a sequence. However, module 1 can describe a registration process of a plurality of event models, and module 2 can describe registration of a plurality of smart contracts. Therefore, from a macro perspective, the process of module 1 and the process of module 2 can be performed during the process of module 3 (or even a process of module 4).

The following briefly describes module 4. Based on module 1 to module 3, assume that the device party detects an event A in S441, the device party can upload the model identifier a and a parameter value of each model parameter related to the event model A to the IoU control center by using S442. The IoU control center can query the contract identifier b corresponding to the model identifier a, and apply to the blockchain network for invoking the smart contract B by using S445. As such, the IOC control center can complete routing from the device party to the service processing logic. In an optional embodiment, module 4 can further include a step shown in a dotted line frame. Before S445, rights for the device party that invokes the smart contract B is detected in S444, and S445 is performed only after the detection succeeds, thereby effectively ensuring data security. After S445, each node in the blockchain network can invoke the service processing logic of the smart contract B to process a service, and feed back an invoking result to the IoU control center by using S447.

In the specific example shown in FIGS. 4A-4B, there is no interaction between the device party and the service party, and there is only a small amount of interaction between the two parties and the IoT control center. However, a wider association is generated by using the blockchain network.

It is worthwhile to note that FIG. 2, FIG. 3, and FIGS. 4A-4B respectively describe different embodiments of the technical concept of the present specification or different manifestations of the embodiments. Operations described between objects corresponding to each other (the association center in FIG. 3 and the IoT control center in FIGS. 4A-4B) can be mutually adaptive, and details are omitted here.

In the previous process, a smart contract invoking mechanism triggered by an event is established between the event party and the service party by using the association center, and an event and data generated by the event party (for example, a device party of an IoT device) are directly processed by using a blockchain service contract, thereby fully utilizing a capability of sharing and cooperating blockchain data. In addition, a unified event model is implemented through registration to record data, so that the service party can perform compatibility and adaptation without modifying a service contract code when connecting to a plurality of event parties. In conclusion, the previous methods can improve service cooperation effectiveness between a plurality of data parties based on the blockchain network.

In a possible implementation, the association center can further be a node in the blockchain network. The association center can be implemented by any device, platform, or device cluster with computing and processing capabilities. In addition, the association center also serves as a node in the blockchain network. For example, the association center specifically serves as a node in the blockchain network and participates in transaction accounting and block formation. In addition, several smart contracts have been pre-deployed in the blockchain network. In this case, a service processing process can include the following steps.

A first model identifier and corresponding first data that correspond to the first event are received. A specific embodiment of the present step is similar to step 301 in FIG. 3, and details are omitted.

Then a first contract identifier associated with the first model identifier is determined based on a pre-stored association relationship between a model identifier and a contract identifier. For a specific implementation of the present step, reference can be made to the description of step 302 in FIG. 3, and details are omitted.

Next, a first transaction that invokes a first smart contract corresponding to the first contract identifier is generated based on the first data, so that each node in the blockchain network executes the first smart contract based on the first data, to perform a service processing logic corresponding to the first smart contract.

It should be understood that in this embodiment, the association center is also a node in the blockchain network. Therefore, the association center can directly generate the first transaction based on the first data. The first transaction invokes the first smart contract, and transmits the first data into the first smart contract as a parameter. Then the first transaction is recorded in a block for recording to the blockchain by using a consensus mechanism.

Specifically, each node in the blockchain network locally maintains a transaction pool, places an obtained transaction in the transaction pool, and broadcasts the transaction to another node. For a node corresponding to the association center (hereafter referred to as an association center node), the node places the first transaction generated based on the first data in the transaction pool, and also broadcasts the first transaction to another node in the blockchain network. The association center node also receives a broadcast transaction from another node and places the received transaction in the transaction pool. When there are enough transactions in the transaction pool, the association center node extracts some transactions from the transaction pool, packs the transactions into a block, and then broadcasts the block packed by the association center node in the blockchain network in order to reach a consensus. In addition, another node in the blockchain network also broadcasts a block packed by the node to initiate consensus. Finally, the nodes agree on a next transaction block to be performed by using the consensus mechanism set in the blockchain network. Therefore, the first transaction is finally recorded in a block of the blockchain through consensus of the nodes.

Once consensus is made on the first transaction, each node performs the first transaction, and then executes the first smart contract based on the first data. When the first smart contract relates to the service processing logic performed by the service party, any node in the blockchain can send a service processing logic notification to the corresponding service party, so that the service party performs the corresponding service logic. Optionally, the service party can also be a node in a blockchain network or correspond to a node, so that the node helps the service party to perform the service processing logic.

In the previous process, the association center also serves as a node in the blockchain network, and generates a transaction that invokes a smart contract based on parameter data of a current event, so that each node in the blockchain completes the service processing logic by executing the smart contract. As such, multi-party data interaction is improved by using a de-centralization feature of the blockchain.

Figure 5:
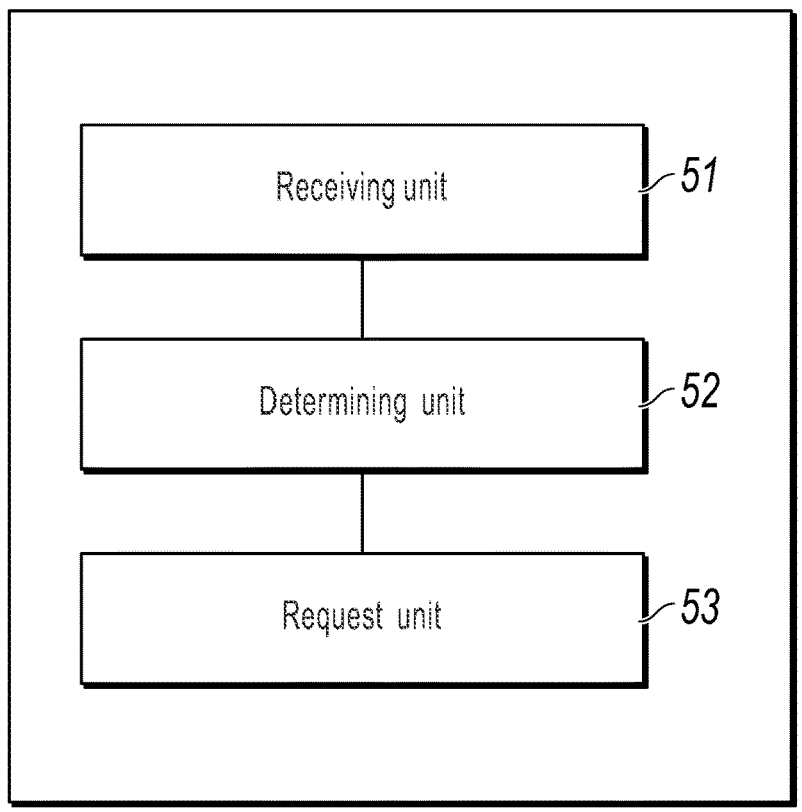
FIG. 5 is a schematic block diagram illustrating an apparatus for processing a service using a blockchain, according to an embodiment.

According to another embodiment, an apparatus for processing a service using a blockchain is provided. The apparatus can be deployed in an association center, and the association center can be implemented by any device, platform, or device cluster with computing and processing capabilities. In addition, a first smart contract is pre-deployed in a blockchain network, and the first smart contract includes a service processing logic triggered by an event. FIG. 5 is a schematic block diagram illustrating an apparatus for processing a service using a blockchain, according to an embodiment. As shown in FIG. 5, the apparatus 500 includes: a receiving unit 51, configured to receive a first model identifier and corresponding first data that correspond to a first event, where the first model identifier is used to indicate a first event model, and the first data is used as parameter data in the first event model to describe the first event; a determining unit 52, configured to determine a first contract identifier associated with the first model identifier based on a pre-stored association relationship between a model identifier and a contract identifier, where the first contract identifier is used to indicate the first smart contract in several smart contracts, and is provided by the blockchain network when a first service party registers the first smart contract with the blockchain network, and the association center records an association relationship between the first contract identifier and at least one model identifier; and a request unit 53, configured to send, based on the first contract identifier, a first request that invokes the first smart contract to a first node in the blockchain network, so that each node in the blockchain network invokes the first smart contract based on the first data, to perform the service processing logic corresponding to the first smart contract.

It is worthwhile to note that the apparatus embodiment shown in FIG. 5 corresponds to the method embodiment shown in FIG. 3. The corresponding description in the method embodiment shown in FIG. 3 is also applicable to the apparatus 500, and details are omitted here.

Specifically, when the association center is a node in the blockchain network, the request unit 53 can be replaced by a generation unit. The generation unit can be configured to generate a first transaction that invokes the first smart contract based on the first contract identifier and the first data and based on the first data, so that each node in the blockchain network invokes the first smart contract based on the first data, to perform the service processing logic corresponding to the first smart contract.

According to another embodiment, a computer readable storage medium is provided, and the computer readable storage medium stores a computer program. When the computer program is performed in a computer, the computer is enabled to perform the method in the first aspect or the second aspect.

According to another embodiment, a computing device is provided, including a memory and a processor. The memory stores executable code, and when performing the executable code, the processor implements the method described with reference to FIG. 3.

A person skilled in the art should be aware that in the previous one or more examples, functions described in the technical solutions in the present specification can be implemented by hardware, software, firmware, or any combination thereof. When the present disclosure is implemented by software, the functions can be stored in a computer readable medium or transmitted as one or more instructions or code in the computer readable medium.

In the described specific implementations, the objective, technical solutions, and benefits of the technical solutions in the present application are further described in detail. It should be understood that the descriptions are merely specific implementations of the technical solutions in the present specification, but are not intended to limit the protection scope of the technical solutions in the present specification. Any modification, equivalent replacement, or improvement made based on the technical solutions in the present specification should fall within the protection scope of the technical concept of the present specification.

What is claimed is:

1. A method for processing a corresponding service based on an event detected at a physical device using a blockchain, the method comprising:
providing, by an association center to an event party, an event model identifier for an event model by allocating the event model identifier to the event model in response to determining that the event party selects no event model from an event model list sent by the association center, wherein the event model identifier indicates the event model for describing the event;
receiving, by the association center, the event model identifier and data of the event, wherein the data comprises one or more parameters in the event model;
determining, by the association center, a contract identifier associated with the event model identifier based on a predetermined relationship between the event model identifier and the contract identifier;
identifying, by the association center, a smart contract in a blockchain network based on the contract identifier; and
sending, by the association center, a request that invokes the smart contract to a first node in the blockchain network based on the contract identifier and that causes each node in the blockchain network to invoke the smart contract based on the data to perform service processing logic corresponding to the smart contract.

2. The method of claim 1, wherein the event is detected at an Internet of Things (IoT) device, and the event model comprises description of a state or state change information of the IoT device.

3. The method of claim 1, wherein providing, by the association center, the event model identifier for the event model to the event party, comprises:
receiving an event model query from the event party; and
sending the event model list to the event party.

4. The method of claim 3, wherein the method further comprising:
sending the event model identifier corresponding to the event model to the event party in response to determining that the event party selects the event model from the event model list.

5. The method of claim 1 further comprising: recording, by the association center, the predetermined relationship between the event model identifier and the contract identifier comprising:
receiving an event model query from a service party;
sending an event model list to the service party; and
determining, based on one or more event models selected by the service party from the event model list and the contract identifier, the predetermined relationship between each event model identifier corresponding to the one or more selected event models and the contract identifier.

6. The method of claim 1, wherein the service processing logic of the smart contract processes a service by using the data as an input parameter, the request that invokes the smart contract corresponds to a transaction, and a data field of the transaction comprises variable assignment information that indicates that the data is assigned to a parameter in the smart contract.

7. The method of claim 1, wherein a verification logic corresponds to the smart contract in the association center, and sending, by the association center, the request that invokes the smart contract to the first node in the blockchain network based on the contract identifier further comprises:
performing the verification logic on the data based on the contract identifier; and
sending the request that invokes the smart contract to the first node in the blockchain network in response to determining that verification succeeds.

8. The method of claim 7, wherein the verification logic comprises verification for at least one of the following:
user rights of an event party;
whether a data format of the data is correct; or
whether the data is complete.

9. The method of claim 1, further comprising, before sending, by the association center, based on the contract identifier, the request that invokes the smart contract to the first node in the blockchain network based on the contract identifier:
determining a nearest node to the association center as the first node from a plurality of nodes in the blockchain network.

10. A non-transitory, computer-readable medium storing one or more instructions executable by a computer system to perform operations comprising:
providing, by an association center to an event party, an event model identifier for an event model by allocating the event model identifier to the event model in response to determining that the event party selects no event model from an event model list sent by the association center, wherein the event model identifier indicates the event model for describing an event;
receiving, by the association center, the event model identifier and data of the event, wherein the data comprises one or more parameters in the event model;
determining, by the association center, a contract identifier associated with the event model identifier based on a predetermined relationship between the event model identifier and the contract identifier;
identifying, by the association center, a smart contract in a blockchain network based on the contract identifier; and
sending, by the association center, a request that invokes the smart contract to a first node in the blockchain network based on the contract identifier and that causes each node in the blockchain network to invoke the smart contract based on the data to perform service processing logic corresponding to the smart contract.

11. The non-transitory, computer-readable medium of claim 10, wherein the event is detected at an Internet of Things (IoT) device, and the event model comprises description of a state or state change information of the IoT device.

12. The non-transitory, computer-readable medium of claim 10, wherein providing, by the association center, the event model identifier for the event model to the event party, comprises:
receiving an event model query from the event party; and
sending the event model list to the event party.

13. The non-transitory, computer-readable medium of claim 12, the operations further comprising:
sending the event model identifier corresponding to the event model to the event party in response to determining that the event party selects the event model from the event model list.

14. The non-transitory, computer-readable medium of claim 10, the operations further comprising: recording, by the association center, the predetermined relationship between the event model identifier and the contract identifier, comprising:
receiving an event model query from a service party;
sending an event model list to the service party; and
determining, based on one or more event models selected by the service party from the event model list and the contract identifier, the predetermined relationship between each event model identifier corresponding to the one or more selected event models and the contract identifier.

15. The non-transitory, computer-readable medium of claim 10, wherein the service processing logic of the smart contract processes a service by using the data as an input parameter, the request that invokes the smart contract corresponds to a transaction, and a data field of the transaction comprises variable assignment information that indicates that the data is assigned to a parameter in the smart contract.

16. The non-transitory, computer-readable medium of claim 10, wherein a verification logic corresponds to the smart contract in the association center, and sending, by the association center, the request that invokes the smart contract to the first node in the blockchain network based on the contract identifier further comprises:
performing the verification logic on the data based on the contract identifier; and
sending the request that invokes the smart contract to the first node in the blockchain network in response to determining that verification succeeds.

17. The non-transitory, computer-readable medium of claim 16, wherein the verification logic comprises verification for at least one of the following:
user rights of an event party;
whether a data format of the data is correct; or
whether the data is complete.

18. The non-transitory, computer-readable medium of claim 10, the operations further comprising, before sending, by the association center, based on the contract identifier, the request that invokes the smart contract to the first node in the blockchain network based on the contract identifier:

determining a nearest node to the association center as the first node from a plurality of nodes in the blockchain network.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

providing, by an association center to an event party, an event model identifier for an event model by allocating the event model identifier to the event model in response to determining that the event party selects no event model from an event model list sent by the association center, wherein the event model identifier indicates the event model for describing an event;

receiving, by the association center, the event model identifier and data of the event, wherein the data comprises one or more parameters in the event model;

determining, by the association center, a contract identifier associated with the event model identifier based on a predetermined relationship between the event model identifier and the contract identifier;

identifying, by the association center, a smart contract in a blockchain network based on the contract identifier; and sending, by the association center, a request that invokes the smart contract to a first node in the blockchain network based on the contract identifier and that causes each node in the blockchain network to invoke the smart contract based on the data to perform service processing logic corresponding to the smart contract.

20. The computer-implemented system of claim 19, wherein the event is detected at an Internet of Things (IoT) device, and the event model comprises description of a state or state change information of the IoT device.

* * * * *